United States Patent
Karmaker et al.

(10) Patent No.: US 11,258,322 B2
(45) Date of Patent: Feb. 22, 2022

(54) HIGH SPEED INDUCTION MACHINE

(71) Applicant: TECO-Westinghouse Motor Company, Round Rock, TX (US)

(72) Inventors: Haran Chandra Karmaker, Round Rock, TX (US); Edward Kuan-Chen Chen, Austin, TX (US); James Arnold Keck, Round Rock, TX (US); Paulo Guedes-Pinto, Round Rock, TX (US)

(73) Assignee: TECO-Westinghouse Motor Company, Round Rock, TX (US)

( * ) Notice: Subject to any disclaimer, the term of this patent is extended or adjusted under 35 U.S.C. 154(b) by 0 days.

(21) Appl. No.: 16/227,639

(22) Filed: Dec. 20, 2018

(65) Prior Publication Data
US 2020/0204022 A1    Jun. 25, 2020

(51) Int. Cl.
| | |
|---|---|
| *H02K 3/24* | (2006.01) |
| *H02K 1/16* | (2006.01) |
| *H02K 1/26* | (2006.01) |
| *H02K 1/30* | (2006.01) |
| *H02K 3/42* | (2006.01) |

(Continued)

(52) U.S. Cl.
CPC ........... *H02K 3/24* (2013.01); *H02K 1/16* (2013.01); *H02K 1/26* (2013.01); *H02K 1/30* (2013.01); *H02K 3/12* (2013.01); *H02K 3/42* (2013.01); *H02K 15/028* (2013.01); *H02K 15/12* (2013.01); *H02K 2203/15* (2013.01)

(58) Field of Classification Search
CPC .. H02K 3/20; H02K 1/16; H02K 5/04; H02K 15/024; H02K 9/10
USPC ....... 310/58, 60 R, 156.65, 156.67, 216.004, 310/7–8, 216.016, 216.018, 60 A
See application file for complete search history.

(56) References Cited

U.S. PATENT DOCUMENTS

| | | | | |
|---|---|---|---|---|
| 1,316,790 | A | * | 9/1919 | Grubber ................... H02K 9/06 310/62 |
| 1,594,058 | A | * | 7/1926 | Freiburghouse ......... H02K 1/32 310/63 |

(Continued)

FOREIGN PATENT DOCUMENTS

| | | |
|---|---|---|
| CA | 2256546 | 12/1997 |
| DE | 69300482 | 5/1996 |

(Continued)

OTHER PUBLICATIONS

Machine Translation JP2013090447 (Year: 2013).*

*Primary Examiner* — Jose A Gonzalez Quinones
(74) *Attorney, Agent, or Firm* — Trop, Pruner & Hu, P.C.

(57) ABSTRACT

In one embodiment, a high speed induction machine includes: a stator formed of a first plurality of laminations having a thickness of less than approximately 0.01 inch and a winding comprising a coil formed of Litz wire adapted about the stator; and a rotor adapted within the stator. The rotor may include: a rotor core formed of a second plurality of laminations having a second thickness of greater than approximately 0.10 inch and formed of high strength steel and sandwiched between a first end region including at least one first peripheral second lamination and a second end region including at least one second peripheral second lamination, the first end region having a first end ring retained by a first retaining ring adapted there around, the second end region having a second end ring retained by a second retaining ring adapted there around.

12 Claims, 14 Drawing Sheets

(51) Int. Cl.
*H02K 15/02* (2006.01)
*H02K 15/12* (2006.01)
*H02K 3/12* (2006.01)

(56) References Cited

U.S. PATENT DOCUMENTS

| | | | | |
|---|---|---|---|---|
| 3,675,056 | A | * | 7/1972 | Lenz .................. H02K 9/20 310/54 |
| 3,832,583 | A | * | 8/1974 | Chang ................. H02K 3/48 310/201 |
| 5,495,133 | A | | 2/1996 | Bawin et al. |
| 5,512,792 | A | | 4/1996 | Bawin et al. |
| 5,652,469 | A | * | 7/1997 | Boardman ........... H02K 9/005 310/58 |
| 5,952,764 | A | * | 9/1999 | Nakamura ........ B22D 19/0054 310/211 |
| 6,191,510 | B1 | * | 2/2001 | Landin ................. H02K 1/04 310/216.016 |
| 6,566,778 | B1 | | 5/2003 | Hasegawa et al. |
| 6,933,647 | B2 | | 8/2005 | Kuemmlee et al. |
| 7,242,119 | B2 | * | 7/2007 | Gomes De Lima ..... H02K 3/48 310/52 |
| 7,498,711 | B2 | * | 3/2009 | Biais .................. H02K 1/16 310/214 |
| 7,504,756 | B2 | | 3/2009 | Caprio et al. |
| 8,597,001 | B2 | * | 12/2013 | Saari .................. H02K 9/04 417/423.8 |
| 8,847,448 | B2 | | 9/2014 | Tsui |
| 9,046,105 | B2 | | 6/2015 | Biesenbach et al. |
| 2005/0162025 | A1 | * | 7/2005 | Sivasubramaniam ... H02K 3/14 310/64 |
| 2006/0066169 | A1 | * | 3/2006 | Daugherty ............ H02K 1/02 310/216.016 |
| 2008/0315704 | A1 | * | 12/2008 | Vollmer ................. H02K 3/28 310/198 |
| 2015/0194849 | A1 | * | 7/2015 | Kayano ................ H02K 1/2766 310/156.53 |
| 2016/0190878 | A1 | * | 6/2016 | Saari .................. H02K 9/04 310/59 |

FOREIGN PATENT DOCUMENTS

| | | |
|---|---|---|
| DE | 69311530 | 1/1998 |
| DE | 10043329 | 3/2002 |
| DE | 69734839 | 6/2006 |
| EP | 0608675 | 8/1994 |
| EP | 0609645 | 8/1994 |
| EP | 1312154 | 5/2003 |
| EP | 2528204 | 11/2012 |
| EP | 2806539 | 11/2014 |
| JP | 2013090447 A | * 5/2013 ........... H02K 17/165 |
| WO | 0217461 | 2/2002 |
| WO | 2010100214 | 9/2010 |
| WO | 2012163560 | 6/2012 |

* cited by examiner

HIGH SPEED INDUCTION MACHINE

This invention was made with government support under Grant No. DE-EE0007254 awarded by the Department of Energy. The government has certain rights in the invention.

BACKGROUND

An induction machine comprises a stator and a rotor. Induction machines operate in a manner in which an electric current in the rotor is obtained by electromagnetic induction via a magnetic field of a stator winding. Induction machines are used in many different types of applications, including many industrial applications. While conventional induction machines may adequately operate at low speeds of operation typical for many installations, e.g., at a frequency of 60 Hertz (Hz), there can be many technical challenges including mechanical stresses and electromagnetic stresses and losses when the machines are to operate at high speeds. These challenges, increase as a desired speed of operation increases. To date, current efforts have not resolved all the issues.

SUMMARY OF THE INVENTION

In one aspect, a high speed induction machine includes: a stator formed of a first plurality of laminations, each of the first plurality of laminations having a thickness of less than approximately 0.01 inch, where the stator has a winding comprising a coil formed of Litz wire adapted about the stator; and a rotor adapted within the stator. In an embodiment, the rotor includes: a rotor core formed of a second plurality of laminations, each of the second plurality of laminations having a second thickness of greater than approximately 0.10 inch, the second plurality of laminations formed of high strength steel and sandwiched between a first end region including at least one first peripheral second lamination and a second end region including at least one second peripheral second lamination, the first and second peripheral second laminations having a third thickness, the third thickness greater than the second thickness, the first end region having a first end ring retained by a first retaining ring adapted there around, the second end region having a second end ring retained by a second retaining ring adapted there around.

In an embodiment, the stator may include a single radial ventilation duct adapted at a substantial axial mid-point of the stator. And, the high speed induction machine may be cooled via reverse ventilation to be received via the single radial ventilation duct. The reverse ventilation may circulate from the substantial axial mid-point of the stator to a first peripheral axial portion of the stator and a second peripheral axial portion of the stator.

In another embodiment, the stator may have a substantially cylindrical ductless configuration. And, the high speed induction machine may be cooled via a flow of cooling air to be received at a first peripheral axial portion of the stator and to exhaust from the stator at a second peripheral axial portion of the stator.

In an example, the stator comprises a plurality of axial slots each formed by a pair of a plurality of internal radial stator teeth, where each of the plurality of axial slots is to receive a first coil portion of the winding and a second coil portion of the winding and provide at least one axial channel for cooling air flow. The at least one axial channel may be substantially adjacent an air gap between the stator and the rotor. The first coil portion may be separated from the second coil portion via a non-magnetic spacer to provide a first axial channel for the cooling air flow.

In an embodiment, the rotor core comprises a substantially cylindrical ductless configuration. A surface of the rotor core may be formed with a grooved surface, to reduce loss. This grooved surface may include a plurality of individual circumferential grooves adapted about a circumference of the rotor core.

In an embodiment, the rotor core further comprises a plurality of rotor bars adapted within a corresponding plurality of slots of the rotor core, where each of the plurality of slots comprises a slot opening to a radial exterior of the rotor core, the slot opening having a width substantially narrower than a width of a corresponding rotor bar, to provide stress relief against hoop stress and minimize leakage flux.

In another aspect, a high speed induction machine includes a frame, a stator, and a rotor. The frame may have a first channel to receive a flow of cooling air, a second channel to receive a first flow of exhausted air and a third channel to receive a second flow of exhausted air. The stator may be adapted within the frame and formed of a first axial portion having a first plurality of laminations and a second axial portion having a second plurality of laminations, each of the first and second plurality of laminations having a thickness of less than approximately 0.01 inch. In an axial direction, the stator comprises a single radial ventilation duct adapted between the first axial portion and the second axial portion, the single radial ventilation duct having a plurality of fins to direct the flow of cooling air received via the first channel radially internally. The flow of cooling air may be directed through the first axial portion and output as the first flow of exhausted air through the second channel and through the second axial portion and output as the second flow of exhausted air through the third channel. The stator may also include a plurality of internal radial teeth and a plurality of internal axial slots formed between pairs of the plurality of internal radial teeth, where each of the plurality of internal axial slots is to receive a first coil portion and a second coil portion of one or more coils adapted about the stator and provide a first air channel adapted between the first coil portion and the second coil portion and a second air channel adapted between the second coil portion and an inner diameter of the corresponding internal radial teeth, where the flow of cooling air is to flow through the first air channel and the second air channel. The rotor is adapted within the stator, and includes a rotor core formed of a third plurality of laminations, each of the third plurality of laminations having a second thickness of greater than approximately 0.10 inch, the third plurality of laminations formed of high strength steel and sandwiched between a first end region and a second end region and including at least one first peripheral lamination and at least one second peripheral lamination having a third thickness, the third thickness greater than the second thickness, the first end region having a first end ring retained by a first retaining ring adapted therearound, the second end region having a second end ring retained by a second retaining ring adapted therearound.

In an embodiment, the single radial ventilation duct is adapted at a substantial axial mid-point of the stator. And, the high speed induction machine may be cooled via reverse ventilation that circulates axially outwardly from the substantial axial mid-point of the stator.

In another aspect, a method includes: forming, within a manufacturing fixture, a stack comprising a rotor core for a high speed induction machine, the stack including a first retaining ring, a first resistance ring to be axially and radially constrained by the first retaining ring, a first peripheral plate having a first thickness, a plurality of internal plates having a second thickness less than the first thickness, the second thickness at least approximately 0.10 inch, a second peripheral plate having the first thickness, a second resistance ring, and a second retaining ring to axially and radially constrain the second resistance ring; inserting a plurality of stacking studs through the manufacturing fixture and externally to the stack, and locking the plurality of stacking studs to the manufacturing fixture; heating the stack to at least a first temperature to cause the stack to form a laminated rotor core; cooling a rotary shaft to at least a second temperature, the second temperature substantially lower than the first temperature; and installing the rotary shaft to the laminated rotor core having an interference fit therebetween.

In an embodiment, the method further comprises forming at least one circumferential groove on an external circumference of the laminated rotor core. The method may also include: after heating the stack to at least the first temperature, adapting a first sleeve about an inner circumference of the laminated rotor core; installing the rotary shaft to the laminated rotor core having the first sleeve adapted therebetween; and finishing machining of features of the rotary shaft in relation to a final location of the laminated rotor core with respect to the rotary shaft.

In another embodiment, the method may also include: adapting a second sleeve about an inner circumference of the first sleeve; and installing the rotary shaft to the laminated rotor core having the first sleeve and the second sleeve adapted therebetween.

In yet another embodiment, the method may further include: machining a plurality of interconnected longitudinal grooves on the rotary shaft to serve as high pressure hydraulic fluid conduits; installing the rotary shaft to the laminated rotor core having the first sleeve adapted therebetween; and applying a high pressure hydraulic fluid between the rotary shaft and the first sleeve to expand the first sleeve and the laminated rotor core while applying a force to locate the laminated rotor core upon the rotary shaft. The method also may include: machining a tapered thread about an inner bore of the laminated rotor core; machining a tapered thread on a circumferential surface of the rotary shaft; torqueing the laminated rotor core onto the rotary shaft to a selected interference level; and finishing machining of features of the rotary shaft in relation to a final location of the laminated rotor core with respect to the rotary shaft.

DETAILED DESCRIPTION

In various embodiments, a high speed induction machine is provided having a variety of rotor and stator features that enable high speed operation while ensuring mechanical stability, reduced electrical losses and so forth. In addition, embodiments provide for installation techniques to form a rotor and install a rotor core to a rotary shaft that ensures mechanical integrity, while easing manufacture and avoiding the need for using stacking studs as in a conventional manufacturing, which may negatively impact mechanical stability, owing to the need for forming through holes along an axial length of a rotor core.

Understand that a high speed induction machine as described herein may be used in many different applications, including motoring and generator applications. As used herein the term "high speed," in reference to induction machines, is used to refer to a machine having a peripheral velocity of at least 150 meters per second. With a rotor dimensioned at approximately 10 inches, this peripheral velocity translates to a speed in revolutions per minute of at least 11270 RPM.

A high speed induction machine as described herein may be included in a given system along with a drive system or other power converter which may operate at megawatts levels. Further, due to the high speed nature of the machine, in embodiments this power converter, which may be implemented as a modular power converter, may include high speed switching devices, e.g., based on silicon carbide (SiC) technology. Combinations of a megawatts-based modular power converter and a high speed induction machine herein may be used in many different applications and for incorporation into systems that couple between a utility grid and one or more electrical or mechanical loads and/or sources.

Figure 1:
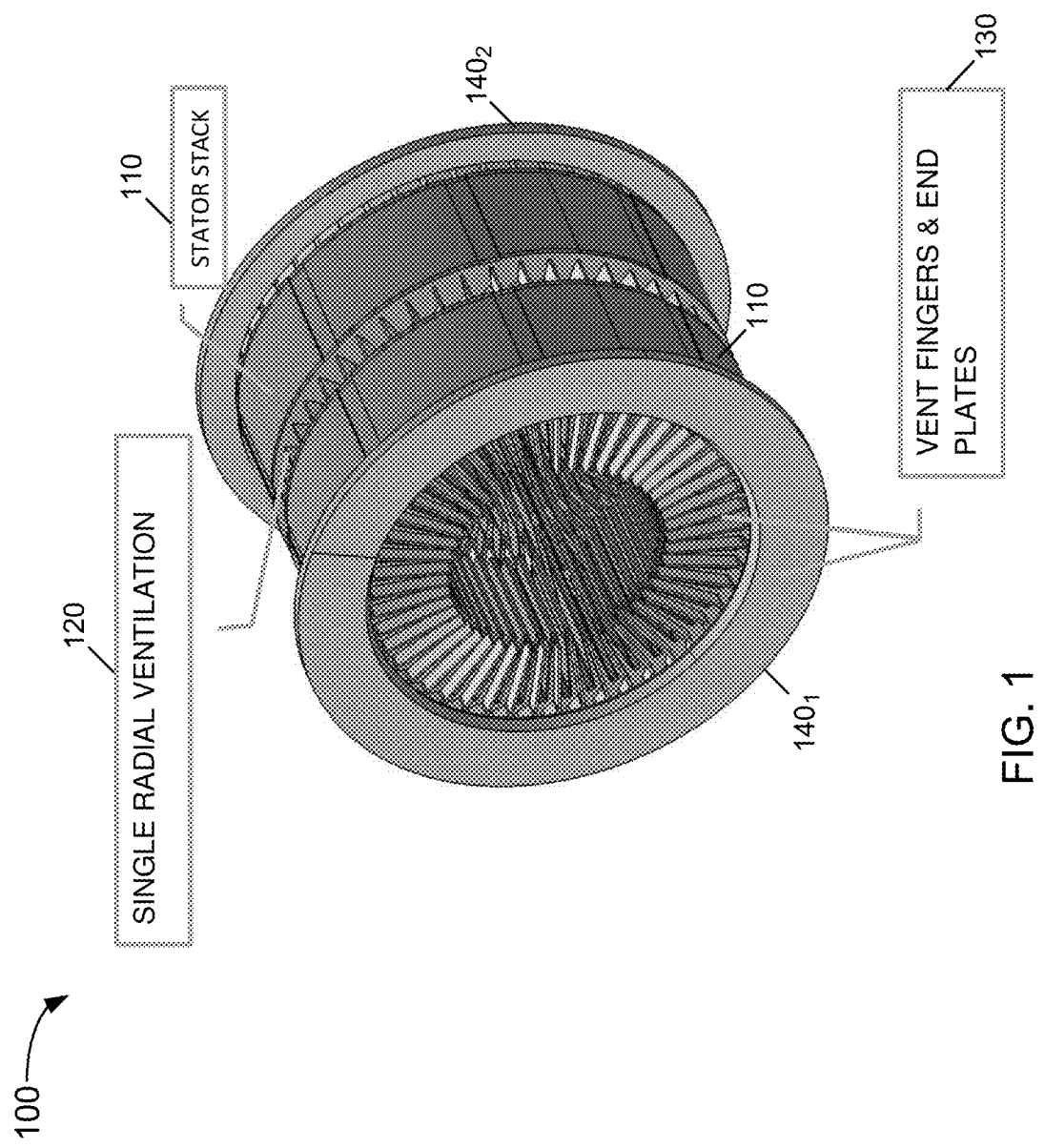
FIG. 1 is an illustration of a stator in accordance with an embodiment of the present invention.

Referring now to FIG. 1, shown is an illustration of a stator in accordance with an embodiment of the present invention. As shown in FIG. 1, stator 100 is formed of a stator stack 110, itself formed of a plurality of laminations. In embodiments herein, these laminations may be ultra-thin stator core laminations to reduce losses. In a particular embodiment, these ultra-thin laminations may have a thickness of between approximately 0.005 and 0.010 inch, and in a particular embodiment, the ultra-thin laminations may have a thickness of approximately 0.010 inches. In contrast, lower speed induction machines have typical stator laminations approximately 0.02 inch thick. Although embodiments may vary, in one embodiment the ultra-thin laminations may be formed of cold rolled fully processed non-oriented electrical steel having very low electrical losses, about 12 W/kg at 400 Hz 1.0 Tesla and only 1 W/kg at 60 Hz. For high speed applications, to minimize core loss on the stator laminations, stack 110 may be configured with laminations to minimize eddy current flow in the laminations.

As further shown in FIG. 1, a single radial ventilation duct 120 is provided substantially at an axial mid-point of stator 100 interposed between two separate sets of laminations of stator stack 110. In embodiments, ventilation duct 120 may have a width of between approximately 1.75 inches and 2.25 inches, and in a particular embodiment, may have a width of approximately 2.0 inches. Such duct may be wider than conventional core ducts. With a single ventilation duct as in the embodiment of FIG. 1, equal air distribution may be ensured on both ends of stator 100, minimizing recirculation. Although an arrangement as in FIG. 1 with a single radial ventilation duct may be used in many embodiments, it is possible in other implementations for a high speed induction machine to have a stator formed of a substantially cylindrical shape and having a ductless configuration. Instead, as described further herein, cooling may be realized internally to a stator core, given internal air gaps or channels formed in various manners as described further herein. Note that these air gaps and channels may be present both in a ductless stator configuration and a stator configuration having a single radial ventilation duct.

Stator stack 110 is adapted between corresponding end plates 140$_1$, 140$_2$. In the illustration of FIG. 1, note that at a first end of stator 100 to which end plate 140 is adapted, a plurality of fingers 130 are provided. If magnetic materials are too close to the winding end turns, the fringe field from the coil can generate eddy currents in the material and create additional losses inside the machine, so fingers 130 and end plate 140 are made from non-magnetic materials with very low electrical conductivity to minimize leakage flux eddy current losses. In an embodiment, these components may be formed of stainless steel alloy.

Figure 2:
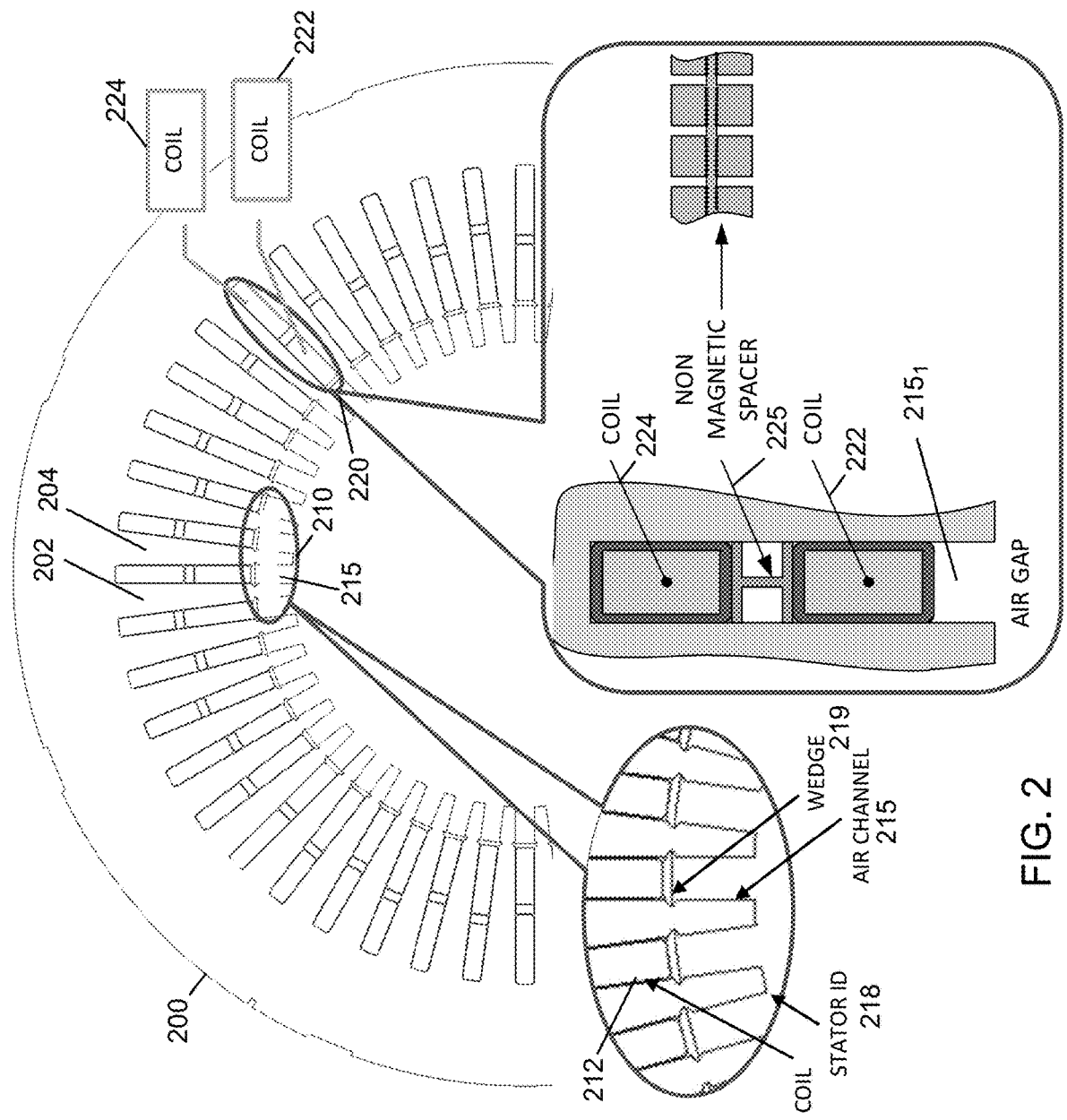
FIG. 2 is a cross-sectional view of a stator in accordance with an embodiment.

Referring now to FIG. 2, shown is a cross-sectional view of a stator in accordance with an embodiment. In the cross-section of FIG. 2, a single stator lamination 200 is shown. As seen, stator lamination 200 includes a plurality of axial air slots 215 formed as recesses in stator lamination 200, which provide a housing for coils and air gaps to enable additional flow of cooling air. More specifically, stator lamination 200 includes a plurality of radially inwardly extending radial teeth, representative ones of which are shown as radial teeth 202, 204, between which a representative axial air slot 215 is formed.

In inset 210, note presence of a coil 212, circumscribed by a wedge 219 made of non-magnetic material. Below wedge 219 exists a recessed air channel 215 through which cooling air may flow. The radial teeth of stator lamination 200 extend to an inner diameter at point 218. Note that in inset 210, only a single coil portion is shown. However, as illustrated more fully in inset 220, each axial air slot 215 may house two coil portions, namely coil portions 224 and 222. In embodiments, the coil of a stator winding may use Litz wires made of compacted film-insulated magnet wires transposed along the length to minimize excessive AC losses due to high frequency operation due to proximity of the wires in a strand. These losses can be as high as over 20 times without transpositions for Litz wires at 500 Hz frequency.

As illustrated in inset 220, axial air slots 215 provide an additional axial air duct to assist with stator coil cooling. Spacers 225 as adapted between coil portions 222, 224 operate as air duct spacers to provide further air channels for flow of cooling air. Note further that coil portions 222, 224 are recessed with axial air slot 215, such that an open geometry is present and may be used to accommodate additional flow of cooling air. Thus in either a ducted or a ductless configuration of a stator, sufficient air channels are provided internally to stator 200 to accommodate a flow of cooling air. Although shown with this particular implementation in FIG. 2, other configurations of stator laminations are possible.

Figure 3:
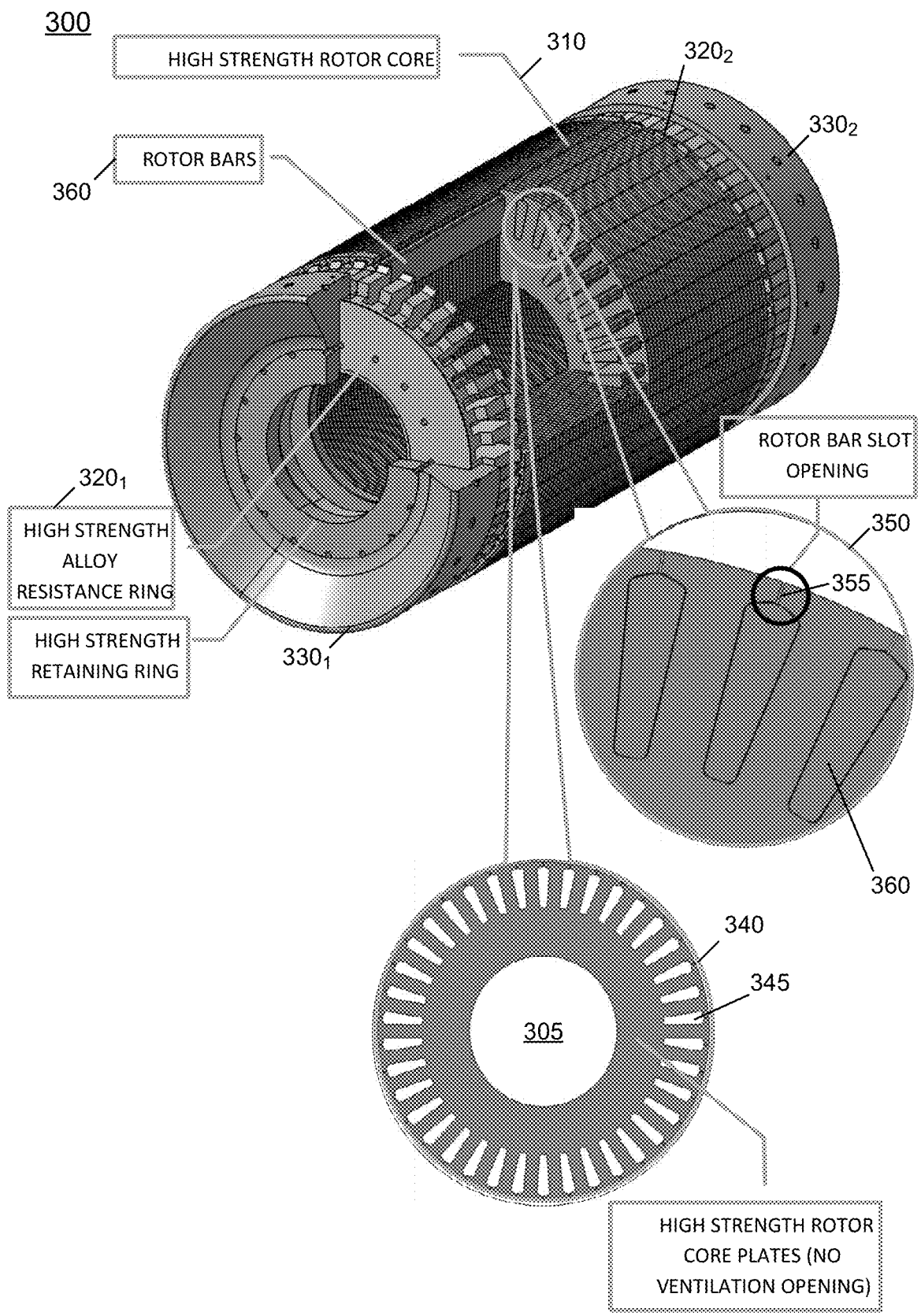
FIG. 3 is an illustration of a rotor in accordance with an embodiment.

Referring now to FIG. 3, shown is an illustration of a rotor in accordance with an embodiment. As shown in FIG. 3, rotor 300 may be formed of a rotor core 310 itself formed of a plurality of laminations, e.g., in the form of plates. Rotor core 310 is a non-solid core, namely having an open cylindrical shape with an opening 305 generally having a size to receive a rotary shaft. As will be described herein, rotor core 310 may be dimensioned with respect to a corresponding rotary shaft to have a heavy interference fit. Axially, rotor core 310 is adapted between a first resistance ring 320$_1$ and a second resistance ring 320$_2$. In turn, resistance rings 320 themselves are bounded by corresponding retaining rings 330$_1$, 330$_2$. Note that resistance rings 320 may act as short circuit rings to which a plurality of rotor bars, e.g., formed of copper or high strength copper alloy, are connected.

In various embodiments, rotor core 310 may be formed of a high strength material, e.g., implemented with a number of laminations or plates. This is so, as high rotor speed produces high hoop stress on rotor components. Therefore, a high strength high permeability material is used (e.g., heat-treated 4340 steel) to withstand the mechanical stress. As used herein, the term "high strength" with regard to materials refers to a given material having a strength on the order of at least 100 kilo pounds per square inch (ksi), in contrast to lower strength materials such as silicon or carbon steels having strengths less than approximately 50 ksi.

Thick laminations are used for rotor core 310 to prevent buckling due to high interference between laminations and a rotor shaft. In an embodiment, lamination thickness can be between approximately 0.125" and 0.250." Very thick laminations (e.g., having a thickness between 0.375" and 0.500") may be mounted at each end of rotor core 310 to reduce the risk of buckling. And in a particular embodiment, the internal rotor laminations may be formed of high strength steel plates having a thickness of greater than approximately 0.175 inch, and the end rotor laminations (e.g., a single peripheral plate on either axial end) may have a thickness of approximately 0.50 inch.

In inset 340, which shows a cross section of a single rotor core plate, note that while there are a plurality of slots 345 through which rotor bars are inserted, there are no ventilation ducts. In contrast, conventional radial rotor ducts are created using steel plates or I-beams sandwiched in between stacks of laminations. Conventional axial ducts or openings on rotor laminations allow air to pass through the rotor axially. However, conventional axial openings can create significant stress under high speed conditions. Steel plates or I-beams have the potential to fly out and cause catastrophic damage during high speed operation.

Instead with embodiments, only very small openings 355, extending from corresponding slots 345 are present, as illustrated in inset 350. Openings 355 provide a stress relief against hoop stress, and also minimize leakage flux induced eddy current losses and improve power factor. Openings 355 may have very small widths, e.g., on the order of approximately 0.015 inch. In any event, the thickness of rotor bar slot openings 355 may be substantially narrower than a thickness of the corresponding rotor bars 360. As an example, rotor bars 360 may be formed with a generally trapezoidal cross section and may have a width on the radially outward end of between approximately 0.2 and 0.4 inches and a depth of between approximately 1 and 2 inches on the radially internal end.

In embodiments, rotor core 310 may be formed with a grooved rotor surface to reduce stray losses. For high speed/frequency applications, high surface and pulsation losses can create extreme heating on the rotor surface. A grooved rotor surface helps to break up the eddy currents and minimize the losses. In different embodiments, this grooved external surface of rotor core 310 may be formed with a plurality of substantially circumferential grooves. In another embodiment, a single spirally adapted circumferential groove may be used. The grooved surface may have a depth of approximately 2 millimeters and a width of approximately 0.5 millimeter; of course other dimensions are possible in other implementations.

In embodiments, the end region of a rotor core experiences high stress due to high speed centrifugal force. As such, resistance rings 320 may be formed of high strength copper alloy. In turn, retaining rings 330 are formed of high strength alloy steel used to protect this region. In a particular example, retaining rings 330 may be formed of the same high strength steel used to form the lamination plates of rotor core 310. In addition, retaining rings 330 are designed to counterbalance the tendency for resistance rings 320 to deform into a conical shape and to provide even support pressure, constraining resistance rings 320, both axially and radially.

Figure 4:
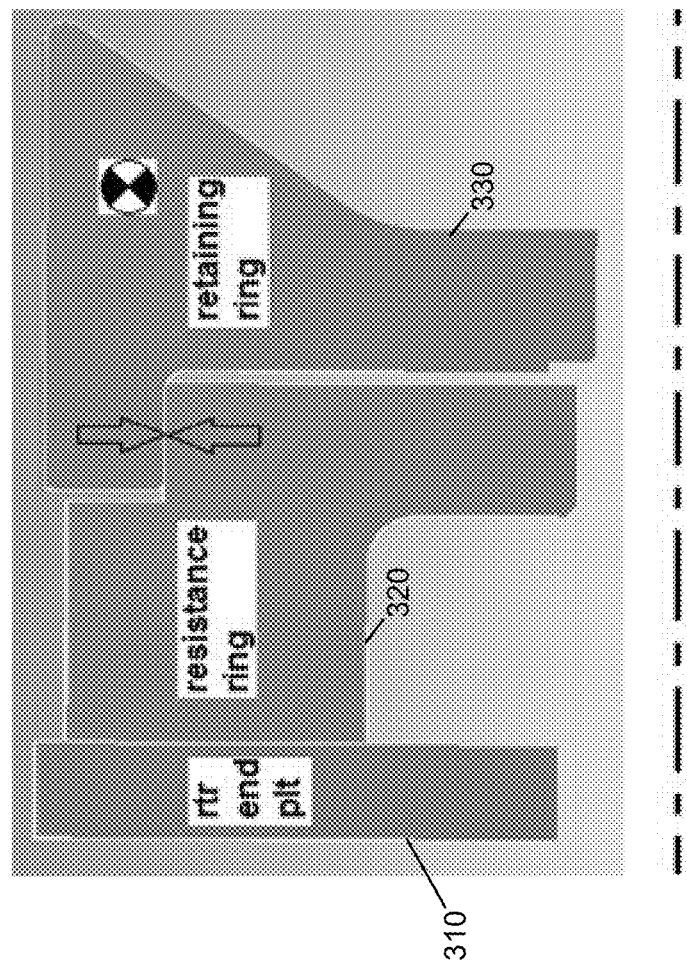
FIG. 4 is a cross-sectional view of a rotor in accordance with an embodiment.

More specifically in FIG. 4, a cross-sectional view of a rotor in accordance with an embodiment is illustrated. Here, rotor 300 includes a resistance ring 320 constrained by a corresponding retaining ring 330. As further shown, note that an end plate of rotor 300, namely end plate $310_E$, may be formed of a thicker lamination (e.g., between 0.375 and 0.5 inches) than other laminations. Of course in some embodiments, multiple end plates may be provided having greater thicknesses than the internal plates of a rotor core.

As described above, in an embodiment end plate $310_E$ and retaining ring 330 may be formed of the same high strength steel material, while instead resistance ring 320 is formed of a high strength copper alloy to which a plurality of rotor bars may be adjoined, e.g., via brazing. Also as shown with the arrow directions in FIG. 4, at high speed operation, centrifugal forces cause an outward pressure on resistance ring 320. With the geometries of resistance ring 320 having a tapered profile (as shown at the point of the arrows meeting), and the corresponding shape of retaining ring 330 adapted around this point, appropriate counterbalancing of opposing forces is realized.

FIG. 4 also shows that as adapted to each other, there may be small axial spaces between resistance ring 320 and retaining ring 330 (at multiple points of the axial profile), to provide space for expansion during manufacturing and operation. In contrast, there is very limited or no space present at the radial point at which resistance ring 320 and retaining ring 330 contact each other where the arrows meet. As further shown, note that a center of mass of retaining ring 330 is arranged substantially axially distally from the contacting point of retaining ring to provide the counterbalancing forces.

Embodiments further provide for a variety of different methods of forming a rotor and adapting a shaft to the rotor. More specifically, with embodiments a rotor as described herein may rely on a heavy interference fit combined with thick laminations, end plates, and a locknut to eliminate the need for stacking studs. That is, in a conventional process, a traditional stacked rotor is formed using stacking studs that extend through pre-existing holes in the rotor laminations to provide proper stacking pressure. However, these pre-existing holes and the inclusion of stacking studs adversely impact performance. This is so as these holes, even when filled with a stacking stud, creates high hoop stresses. Instead with an embodiment, core pressure is maintained and lamination deformation is minimized after a manufacturing fixture has been removed. More specifically, core pressure may be retained by use of thick laminations, a heavy shrink fit, and a locknut against the end plate. This locknut is installed and torqued immediately after core installation but before the fixture is removed. This stacking technique allows a simplified rotor lamination geometry and eliminates the need for any additional holes in the laminations as with a conventional process.

Figure 5:
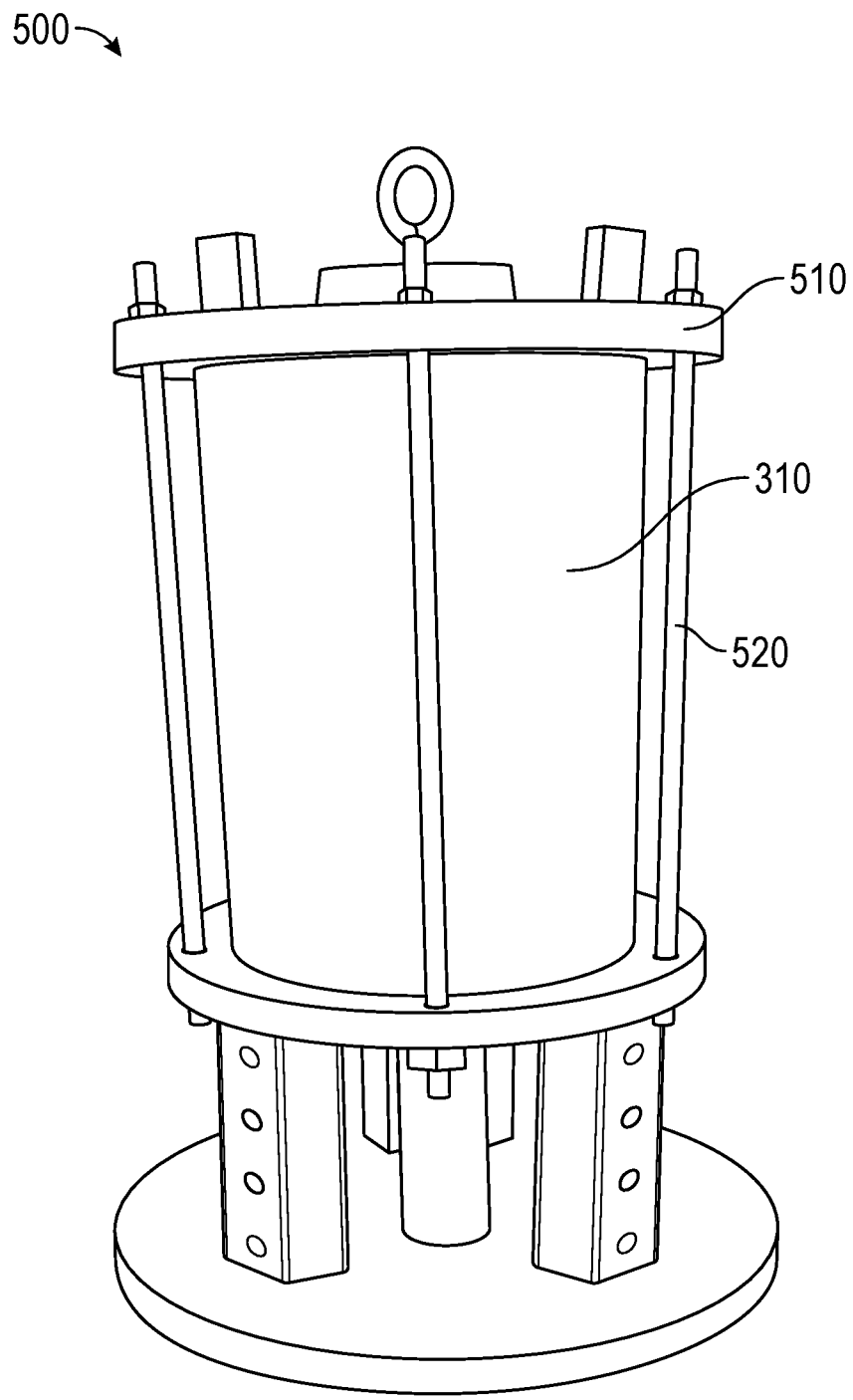
FIG. 5 is an illustration of a manufacturing environment in accordance with an embodiment.

Referring now to FIG. 5, shown is an illustration of a manufacturing environment in accordance with an embodiment. As shown in FIG. 5, in manufacturing environment 500, a manufacturing fixture 510 is provided. As seen, a rotor stack 310 may be formed on fixture 510. When adapted to fixture 510, in addition to the lamination plates, corresponding resistance rings and retaining rings also are provided in the stack up. In contrast to conventional manufacturing processes, instead of providing for internally (to the rotor stack) included studs, a plurality of external stacking studs 520 are adapted about a periphery of fixture 510 and used to lock fixture 510 into place to provide a stacking force on the stacked arrangement of rotor core 310 from this external position.

After this stacking process, fixture 510 may be placed in an oven or other heating mechanism to raise the temperature of rotor core 310 to enable an adjoining process with a rotor shaft (not shown in FIG. 5). As an example, rotor stack 310 may be heated to a temperature of between approximately 375 and 425° Celsius (C), for a time duration of at least 8 hours to cause the individual lamination plates to expand radially.

Thereafter, to assemble the rotor core to a rotor shaft, the rotor shaft may be cooled to an appropriate temperature. For example, a rotor shaft may be placed in dry ice for a period of between approximately 4 and 8 hours to reach a temperature on the order of between approximately −50 and −100° C. After this cooling process and while the rotor core is at a high temperature (e.g., at least 375° C.), an adjoining process may occur in which the rotor shaft is installed within the rotor core. When the hot metal of the rotor core interfaces with the cold metal of the rotary shaft, the rotary shaft thus is heated and expands to realize a desired level of interference fit between the rotary shaft and the rotor core.

Another alternative rotor-to-shaft assembly technique may be used for large rotor diameters. This is so, since as rotor lamination diameters increase above about, e.g., 12 inches, the magnitude of the required interference fit with the shaft increases to a point where the laminations cannot be heated sufficiently to install on the shaft. This is because the amount of heat required for assembly would negatively affect the material properties of the laminations.

As such the stacked rotor laminations of a rotor core may be installed with a shaft and achieve a high level of interference by using concentric tapered sleeves. In this technique, the stacked rotor core is heated to the highest allowable level, e.g., on the order of approximately 400° C. and shrink fit to a sleeve, which may be formed of the same high strength steel as the rotor core with a taper on the inner diameters. The assembly is again reheated to the highest allowable level and placed over the shaft. At this time, an inner segmented sleeve is installed and pulled tight with a lock nut.

Figure 6:
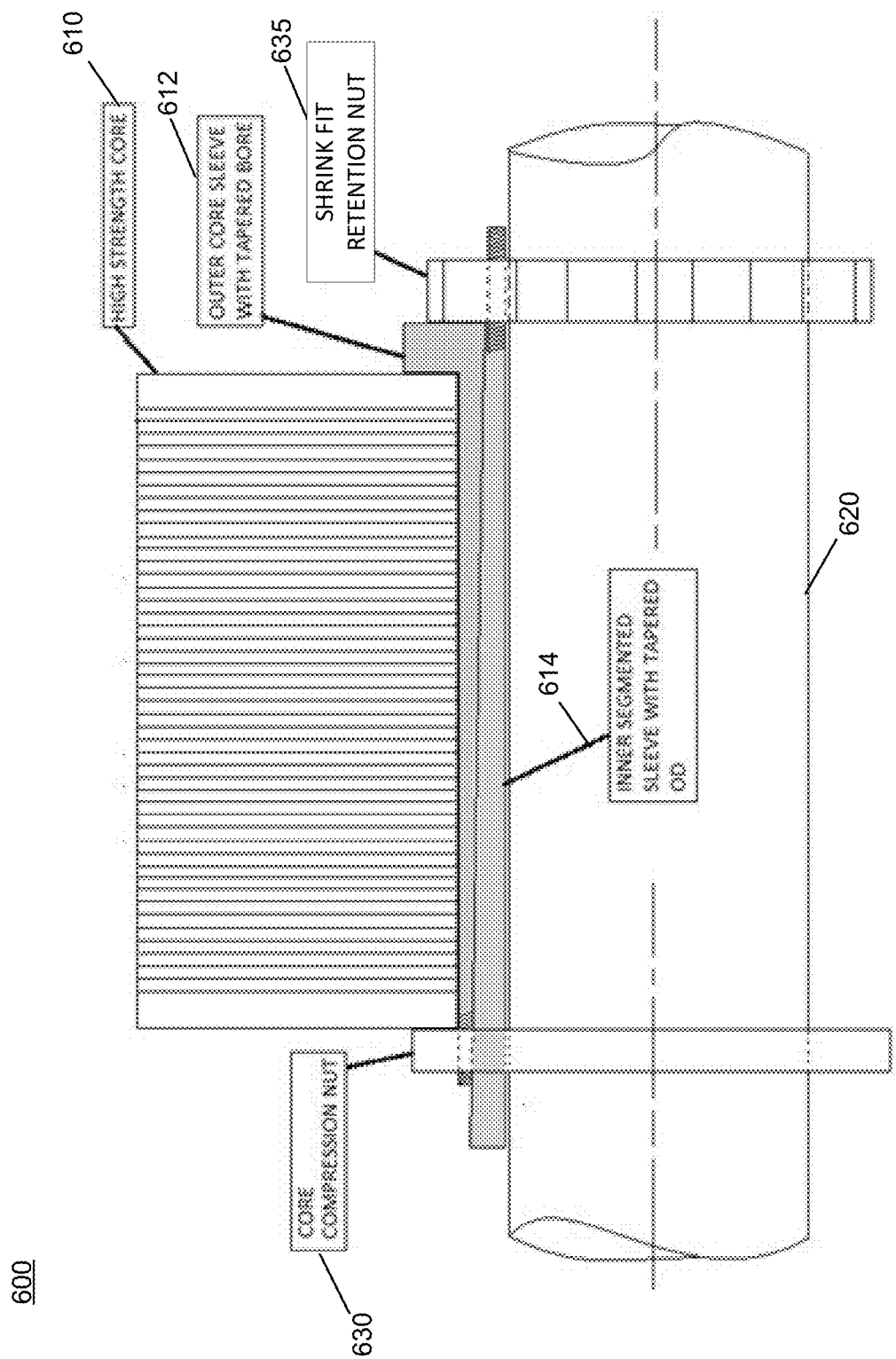
FIG. 6 is an illustration of a rotor and shaft installation in accordance with an embodiment.

Thus as shown in FIG. 6, in a formed arrangement of this process, a rotor 600 results including a rotor core 610 and a rotary shaft 620. Note the presence of an outer core sleeve 612 having a tapered bore and internally thereto, an inner segmented sleeve 614 having a tapered outer diameter. In addition, FIG. 6 shows presence of a core compression nut 630 and a shrink fit retention nut 635 adapted about shaft 620 and at least a portion of sleeves 612, 614 to constrain the arrangement.

In another embodiment, the stacked core is heated to the highest allowable level and shrink fit to a sleeve with a taper on the inner diameter. A retaining nut is mounted at one end of the tapered sleeve to maintain stacking pressure. The assembly is then reheated to the highest allowable level and placed over a tapered shaft and pressed until the desired interference is achieved thereafter. A lock may be installed to retain the stacked core, and the shaft installation is finished.

Figure 7A:
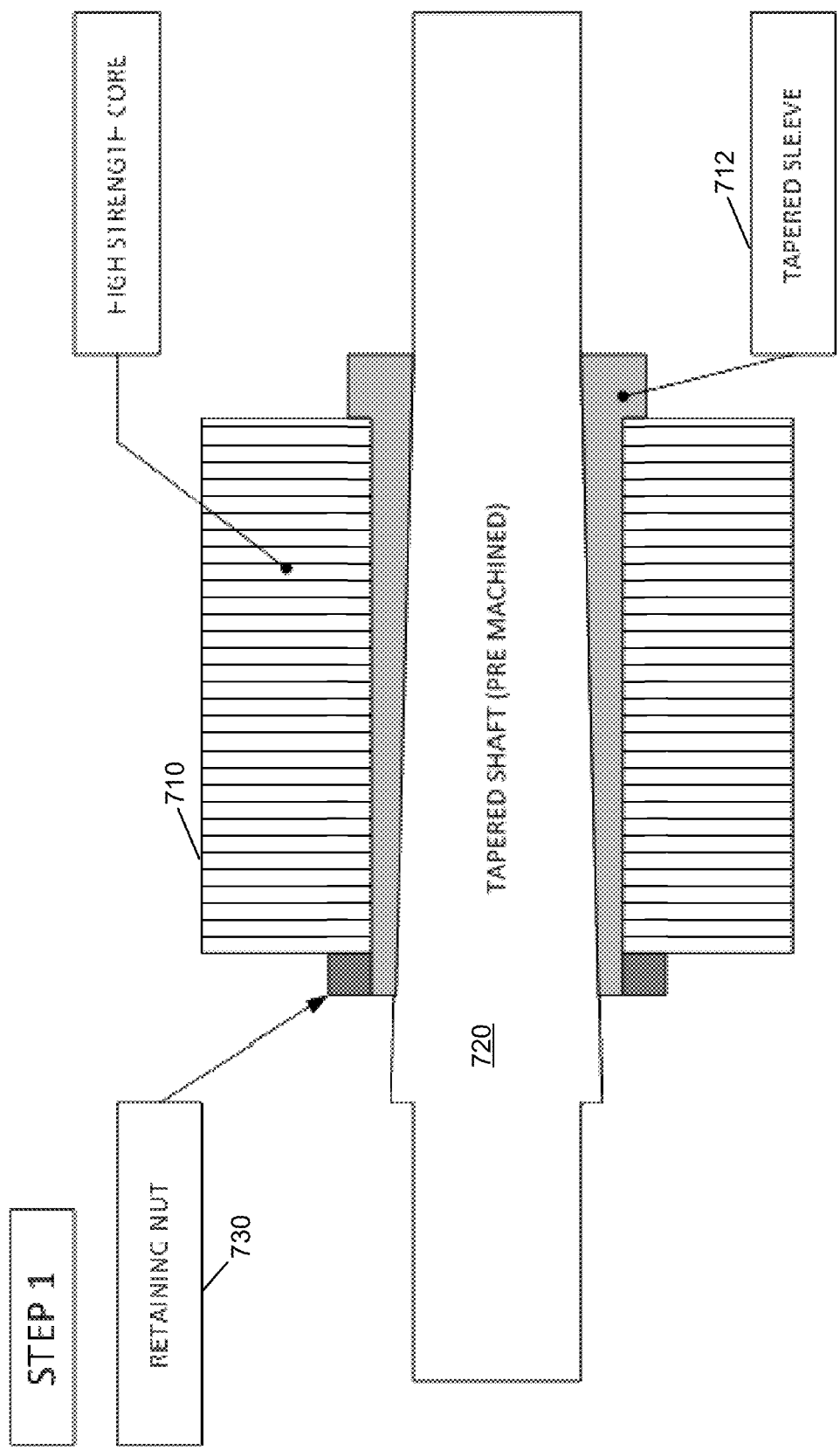
FIG. 7A-7B are illustrations of a method of installing a shaft onto a rotor in accordance with another embodiment.
Figure 7B:
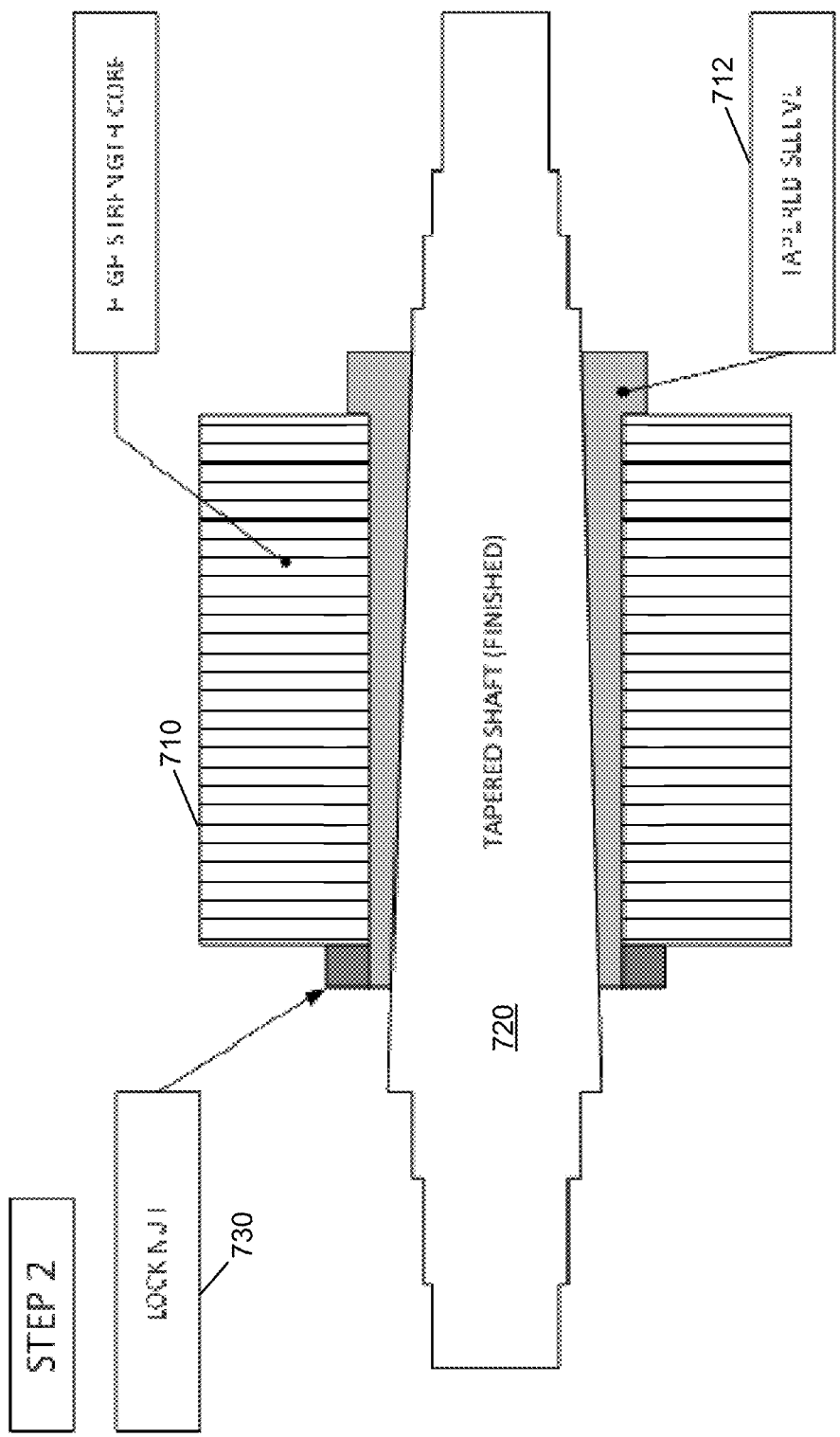

FIG. 7A shows a first step of this manufacturing process in which a retaining nut 730 is mounted at one end of a tapered sleeve 712 in turn adapted between rotor core 710 and a tapered shaft 720, which may be pre-machined. After this process is completed, FIG. 7B shows a second step of the process in which features of tapered shaft 720 may be machine finished to provide a desired shape for purposes in relation to a final location of rotor core 710 and for adapting within a particular high speed machine frame to mate with bearings and so forth.

Figure 8:
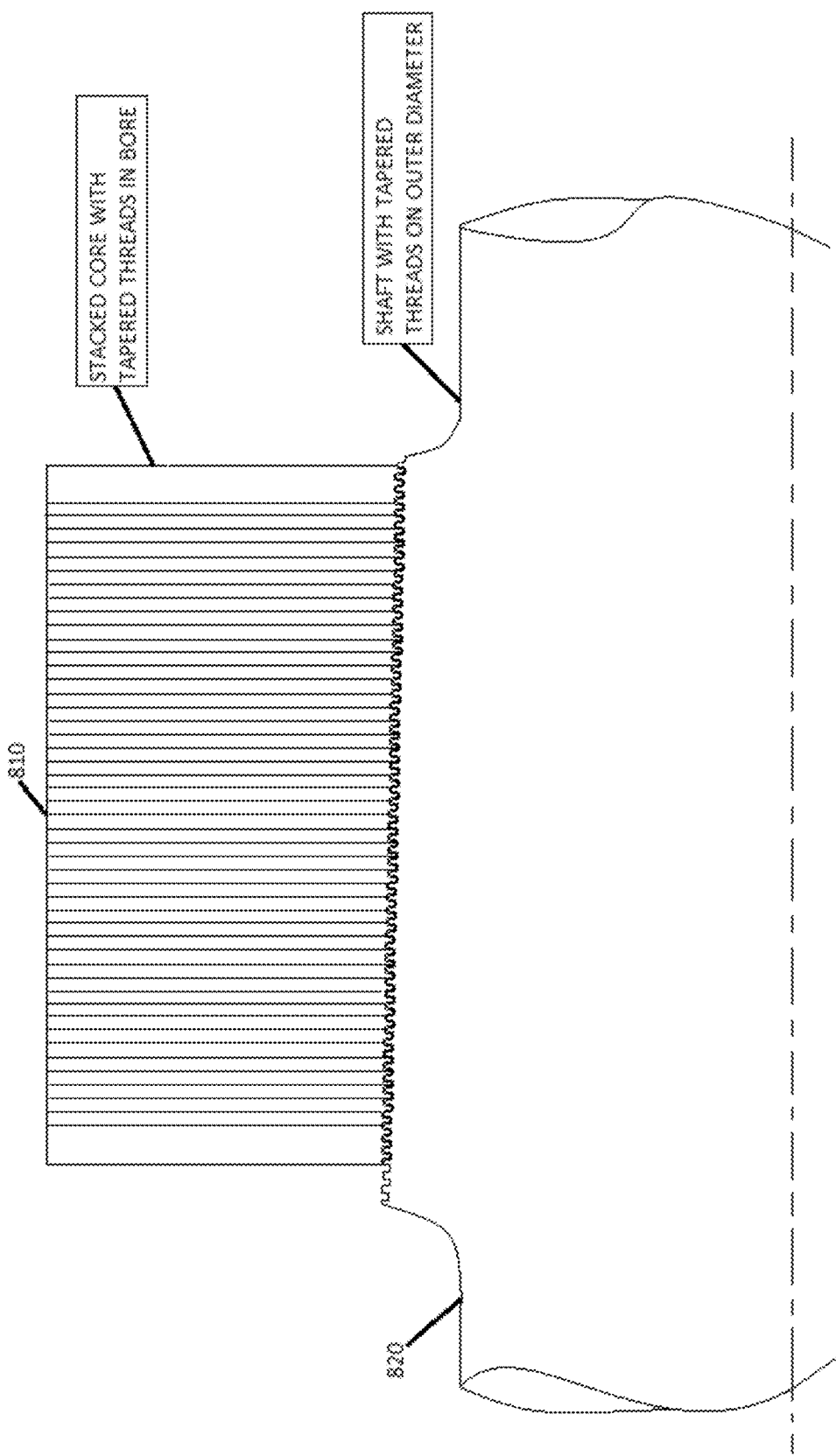
FIG. 8 is an illustration of a rotor and shaft installation in accordance with another embodiment.

In yet another embodiment as shown in FIG. 8, a stacked rotor core 810 is stacked in between two end plates and compression is maintained using a fixture similar to the one described in FIG. 5. Both the outer diameter of shaft 820 and the stacked core 810 inner diameter are threaded. Special fixtures and tooling may be used to apply torque to the stacked core to achieve the required inference level as per measurement of the diametrical growth of the outer diameter. After proper interference has been achieved, the shaft is finish machined.

Figure 9:
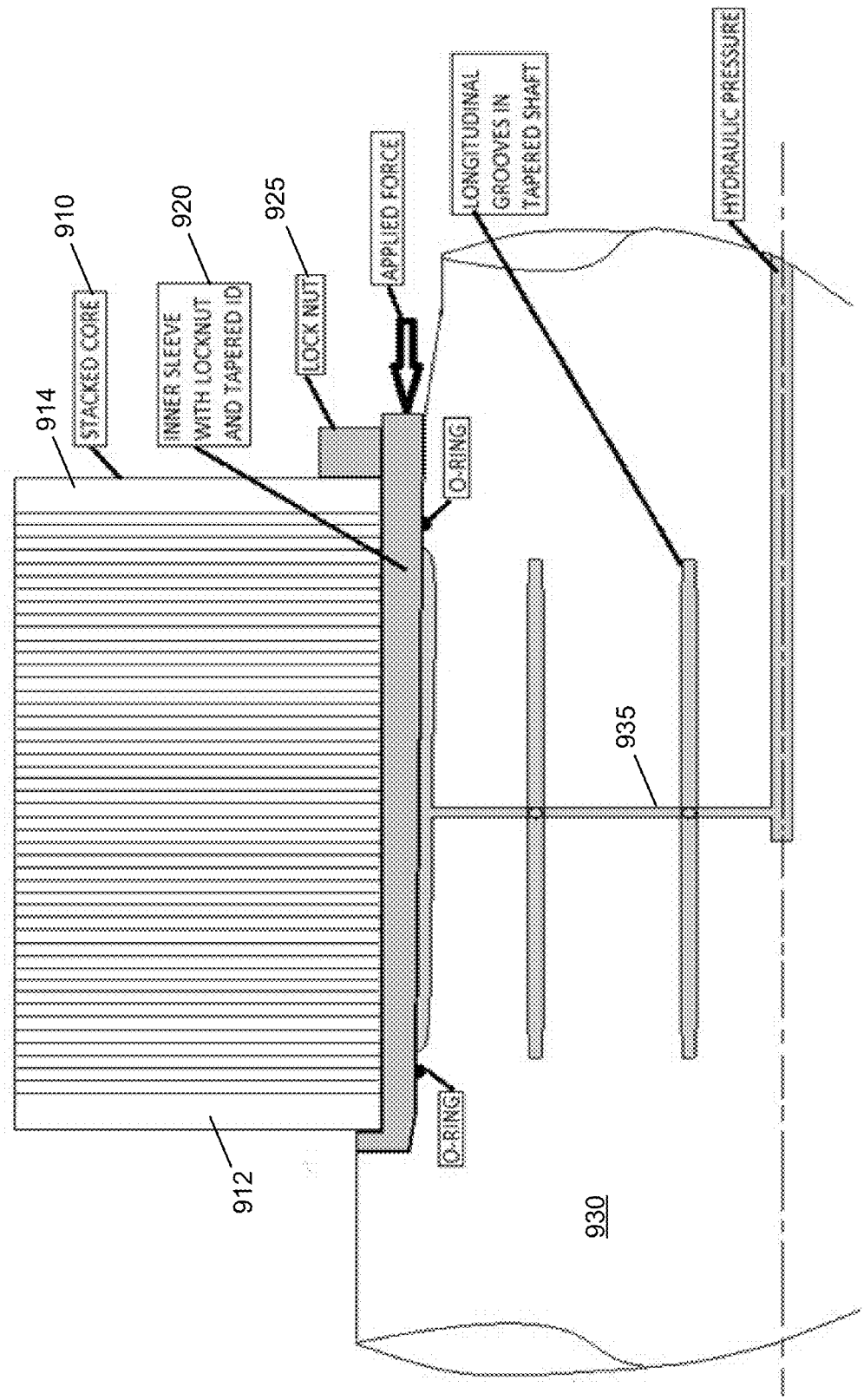
FIG. 9 is an illustration of a rotor and shaft installation in accordance with yet another embodiment.

In a still further embodiment, as shown in FIG. 9, stacked core 910 can be stacked between two end plates 912, 914 and compression is maintained using a sleeve 920 with a lock nut 925 at one end. The bore of sleeve 920 is tapered. Stacked core 910 can be installed to the proper interference using a high pressure hydraulic fluid via a plurality of longitudinal grooves 935 in a shaft 930 to expand sleeve 920 while it is being pressed onto shaft 930.

Using a high speed motor having a stator with a single, substantially centrally axially located ventilation duct, reverse ventilation of a high speed induction machine may occur. With this arrangement, cooled air, driven by external blowers, enters the machine from the center and circulates back on both ends of the machine. Since this high speed rotor has no ducts or internal blowers, external blowers are used to generate the internal air circulation. External blowers provide consistent air flow in variable speed applications and/or adjustable air flow as needed depending on machine operating conditions. In contrast, a conventional machine configuration with a rotor having axial and radial ventilation ducts would typically produce the internal airflow.

Figure 10A:
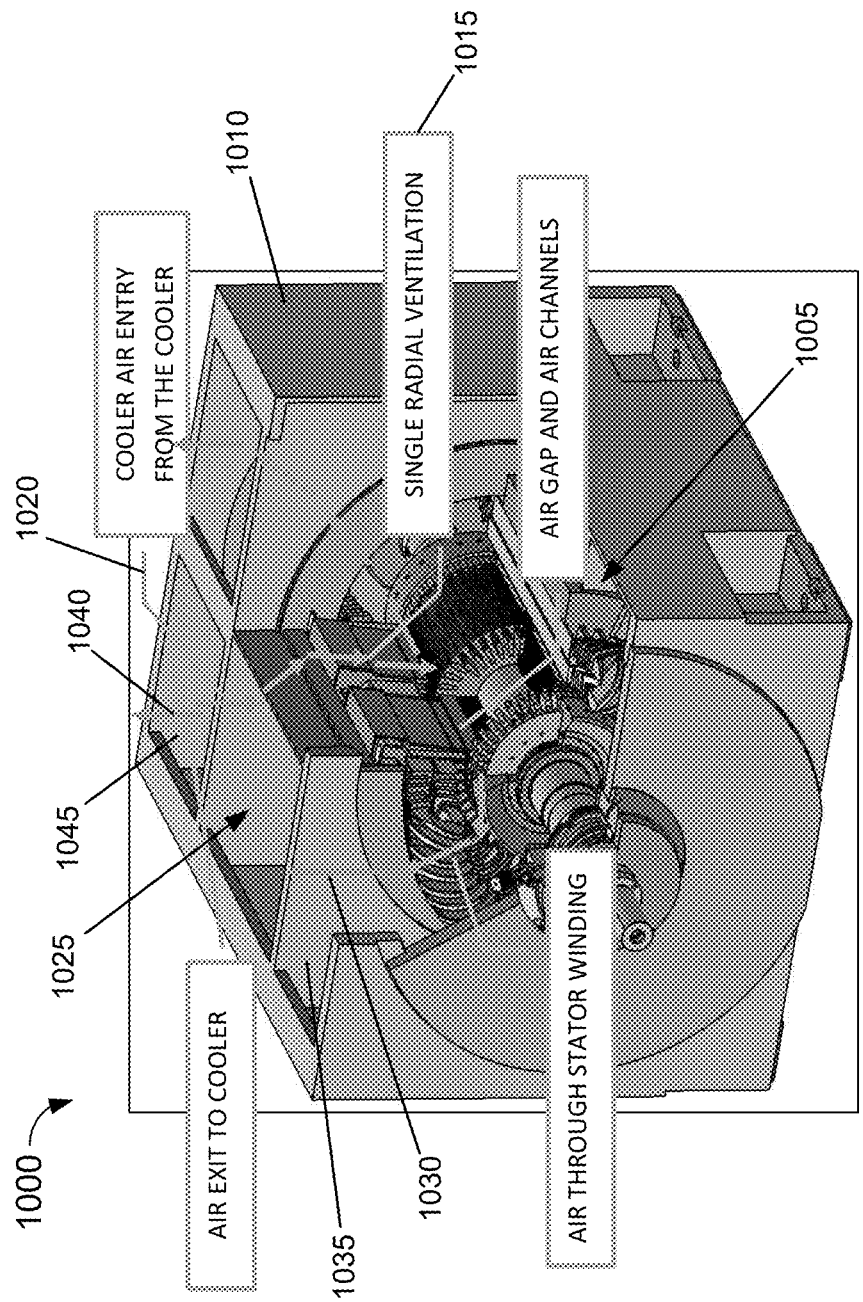
FIG. 10A is a cutaway view of a high speed induction machine environment in accordance with an embodiment.
Figure 10B:
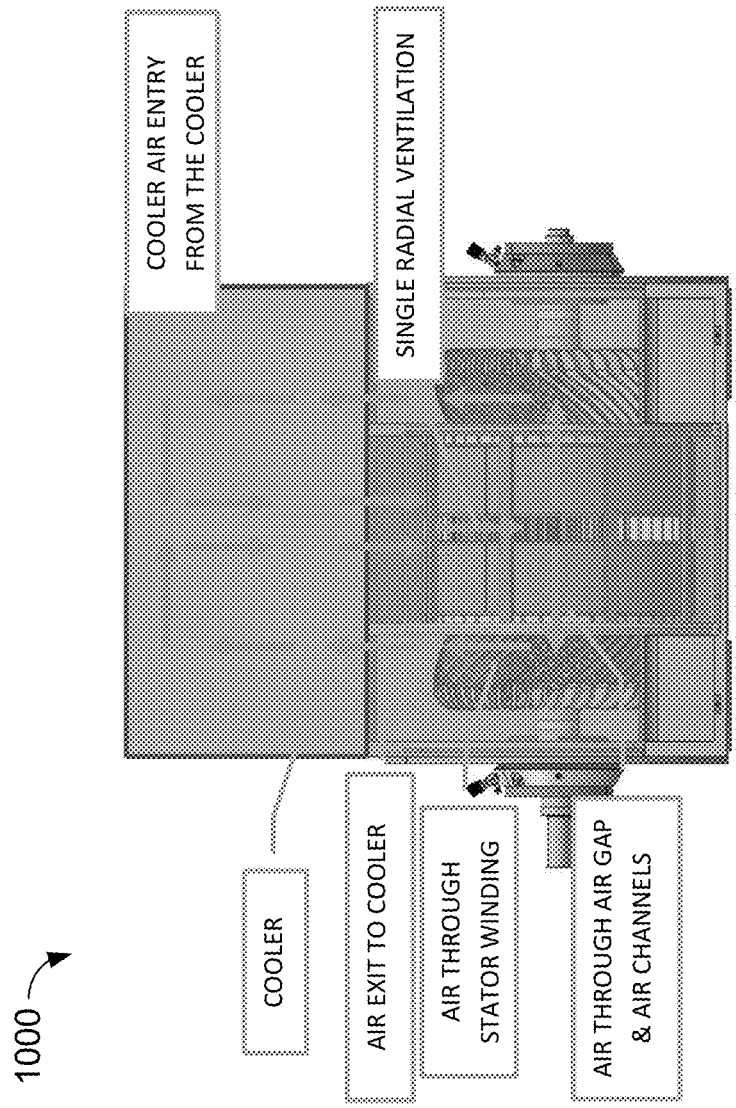
FIG. 10B is a side cutaway view of the FIG. 10A environment in accordance with an embodiment.

Referring now to FIG. 10A, shown is a cutaway view of a high speed induction machine environment in accordance with an embodiment. As shown in FIG. 10A, machine environment 1000 includes a frame 1010, which houses the high speed induction machine 1005 formed of a stator and rotor (with corresponding assembled shaft, as described herein). In the embodiment of FIG. 10A, a reverse ventilation cooling arrangement is shown in which cooling air is received from an (e.g., external) cooler, via air flow 1020 through a first channel 1025. In turn, the cooling air flows downward and into machine 1005 via single radial ventilation duct 1015. The cooling air flows through air gaps and air channels within the stator as described herein, and the air gap between the stator and rotor. After exiting from either axial end of the stator through the stator windings, the air exits as exhaust flows 1030, 1040 via second and third channels 1035, 1045, respectively, back to the cooler for further cooling. FIG. 10B also shows a side view with the flow of cooling air.

Figure 11A:
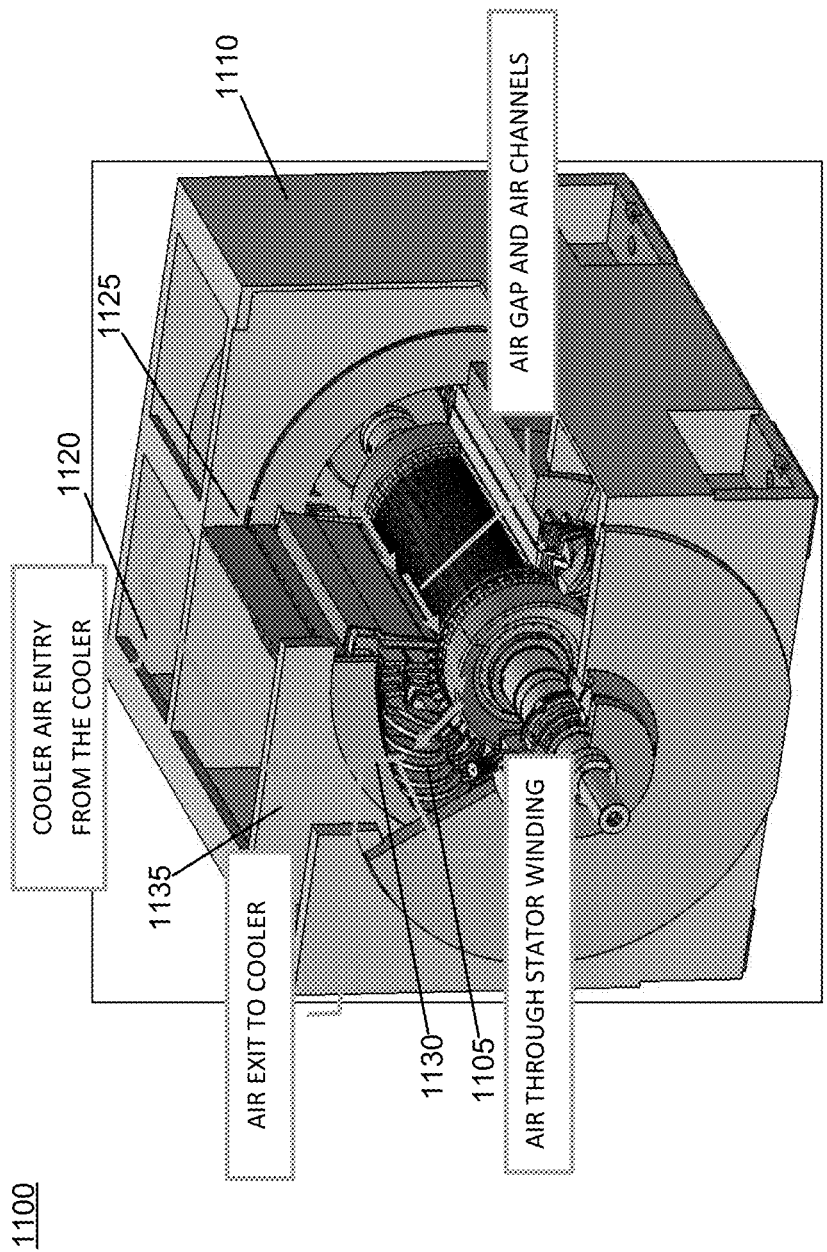
FIG. 11A is a cutaway view of a high speed induction machine environment in accordance with another embodiment.

In another implementation, a single ventilation technique may be used in which cooled air, driven by external blowers, enters a machine from one end and circulates back to the other end of the machine through air gaps. Referring now to FIG. 11A, shown is a cutaway view of a high speed induction machine environment in accordance with another embodiment. As shown in FIG. 11A, machine environment 1100 includes a frame 1110, which houses a high speed induction machine 1105 formed of a stator and rotor (with corresponding assembled shaft, as described herein).

Figure 11B:
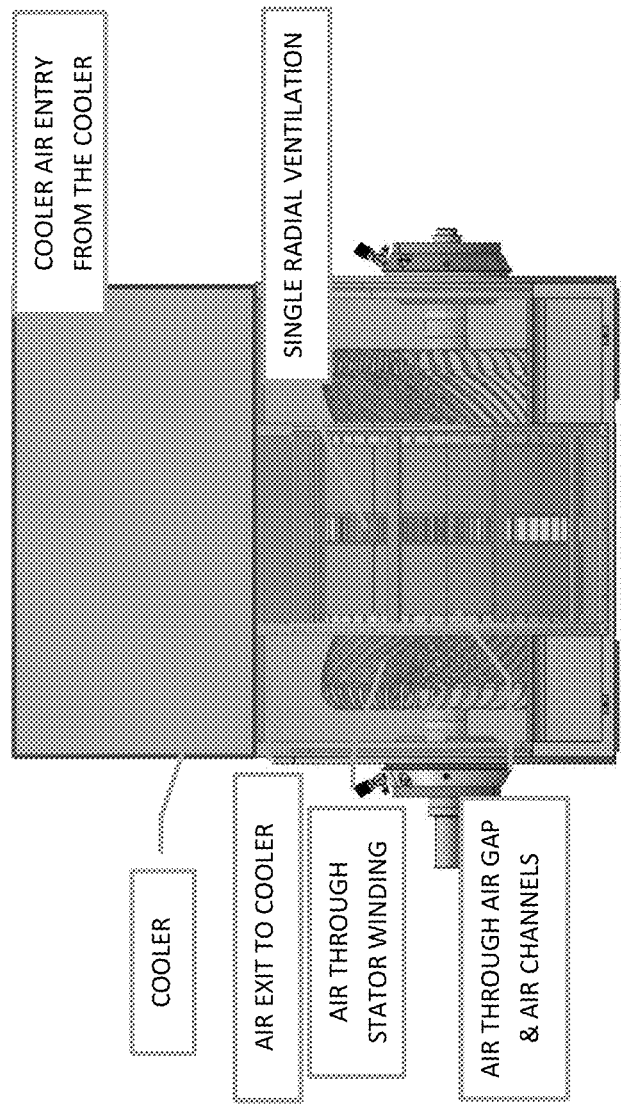
FIG. 11B is a side cutaway view of the FIG. 11A environment in accordance with an embodiment.

In the arrangement of FIG. 11A, with a ductless stator, cooling air from a cooler enters frame 1110 at a first peripheral axial portion of machine 1105 as air flow 1120 through a first channel 1125 and, via an air gap between rotor and stator and air channels as described herein, the flow of cooling air passes axially through machine 1105 and exits, as exhaust flow 1130 via a channel 1135 to the cooler. FIG. 11B also shows a side view with the flow of cooling.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A high speed induction machine comprising:
a stator formed of a first plurality of laminations, each of the first plurality of laminations having a thickness of less than approximately 0.01 inch, wherein the stator has a winding comprising a coil adapted about the stator and a plurality of axial slots each formed by a pair of a plurality of internal radial stator teeth, wherein each of the plurality of axial slots is to receive a first coil portion of the winding and a second coil portion of the winding and provide at least one first axial channel apart from the winding and between the first coil portion and the second coil portion for cooling air flow, wherein the first coil portion is separated from the second coil portion via a non-magnetic spacer having a first member adjacent the first coil portion, a second member adjacent the second coil portion, and a third member to separate the first member from the second member, to provide the first axial channel for the cooling air flow, the first coil portion and the second coil portion recessed within the plurality of axial slots such that a second axial channel is formed within the plurality of axial slots and substantially adjacent an air gap between the stator and a rotor for the cooling air flow, the coil formed of Litz wire, wherein the stator comprises a single radial ventilation duct adapted at a substantial axial mid-point of the stator to receive the cooling air flow to cool the high speed induction machine via reverse ventilation; and
the rotor adapted within the stator, the rotor comprising:
a rotor core formed of a second plurality of laminations, each of the second plurality of laminations having a second thickness of greater than approximately 0.10 inch, the second plurality of laminations formed of high strength steel and sandwiched between a first end region including at least one first peripheral second lamination and a second end region including at least one second peripheral second lamination, the first and second peripheral second laminations having a third thickness, the third thickness greater than the second thickness, the first end region having a first end ring retained by a first retaining ring adapted there around, the first retaining ring having a center of mass located substantially distally axially from a point of contact with the first end ring, the second end region having a second end ring retained by a second retaining ring adapted there around.

2. The high speed induction machine of claim 1, wherein the reverse ventilation is to circulate from the substantial axial mid-point of the stator to a first peripheral axial portion of the stator and a second peripheral axial portion of the stator.

3. The high speed induction machine of claim 1, wherein the stator comprises a substantially cylindrical ductless configuration.

4. The high speed induction machine of claim 3, wherein the high speed induction machine is to be cooled via the cooling air flow to be received at a first peripheral axial portion of the stator and to exhaust from the stator at a second peripheral axial portion of the stator.

5. The high speed induction machine of claim 1, wherein the rotor core comprises a substantially cylindrical ductless configuration.

6. The high speed induction machine of claim 5, wherein a surface of the rotor core comprises a grooved surface, to reduce loss.

7. The high speed induction machine of claim 6, wherein the grooved surface comprises a plurality of individual circumferential grooves adapted about a circumference of the rotor core.

8. The high speed induction machine of claim 1, wherein the rotor core further comprises a plurality of rotor bars adapted within a corresponding plurality of slots of the rotor core, wherein each of the plurality of slots comprises a slot opening to a radial exterior of the rotor core, the slot opening having a width substantially narrower than a width of a corresponding rotor bar, to provide stress relief against hoop stress and minimize leakage flux.

9. A high speed induction machine comprising:
a frame having a first channel to receive a flow of cooling air, a second channel to receive a first flow of exhausted air and a third channel to receive a second flow of exhausted air;
a stator adapted within the frame, the stator formed of a first axial portion having a first plurality of laminations and a second axial portion having a second plurality of laminations, each of the first and second plurality of laminations having a thickness of less than approximately 0.01 inch, wherein in an axial direction, the stator comprises a single radial ventilation duct adapted between the first axial portion and the second axial portion, the single radial ventilation duct having a plurality of fins to direct the flow of cooling air received via the first channel radially internally, wherein the flow of cooling air is to be directed through the first axial portion and output as the first flow of exhausted air through the second channel and through the second axial portion and output as the second flow of exhausted air through the third channel, the stator comprising a plurality of internal radial teeth and a plurality of internal axial slots formed between pairs of the plurality of internal radial teeth, wherein each of the plurality of internal axial slots is to receive a first coil portion and a second coil portion of one or more coils recessed within the plurality of internal axial slots and adapted about the stator and provide a first air channel external to the one or more coils and adapted between the first coil portion and the second coil portion and a second air channel adapted within the plurality of internal axial slots between the second coil portion and an inner diameter of the corresponding internal radial teeth, wherein the flow of cooling air is to flow through the first air channel and the second air channel; and
a rotor adapted within the stator, the rotor comprising a rotor core formed of a third plurality of laminations, each of the third plurality of laminations having a second thickness of greater than approximately 0.10 inch, the third plurality of laminations formed of high strength steel and sandwiched between a first end region and a second end region and including at least one first peripheral lamination and at least one second peripheral lamination having a third thickness, the third thickness greater than the second thickness, the first end region having a first end ring retained by a first retaining ring adapted therearound, the first retaining ring having a center of mass located substantially distally axially from a point of contact with the first end ring, the second end region having a second end ring retained by a second retaining ring adapted therearound, the second retaining ring having a center of mass located substantially distally axially from a point of contact with the second end ring.

10. The high speed induction machine of claim 9, wherein the single radial ventilation duct is adapted at a substantial axial mid-point of the stator.

11. The high speed induction machine of claim 10, wherein the high speed induction machine is to be cooled via reverse ventilation that circulates axially outwardly from the substantial axial mid-point of the stator.

12. A high speed induction machine comprising:
a stator formed of a first plurality of laminations, each of the first plurality of laminations having a thickness of less than approximately 0.01 inch, wherein the stator has a winding comprising a coil adapted about the stator, the coil formed of Litz wire, the stator comprising a single radial ventilation duct adapted at a substantial axial mid-point of the stator to cause the high speed induction machine to be cooled via reverse ventilation to be received via the single radial ventilation duct, and a plurality of axial slots each formed by a pair of a plurality of internal radial stator teeth, wherein each of the plurality of axial slots is to receive a first coil portion of the winding and a second coil portion of the winding recessed within the plurality of axial slots and provide a first axial channel within the plurality of axial slots substantially adjacent an air gap between the stator and a rotor for cooling air flow and a second axial channel adapted between the first coil portion and the second coil portion for the cooling air flow, wherein the stator comprises a single radial ventilation duct adapted at a substantial axial mid-point of the stator to enable the high speed induction machine to be cooled via reverse ventilation to be received via the single radial ventilation duct, wherein the reverse ventilation is to circulate from the substantial axial mid-point of the stator to a first peripheral axial portion of the stator and a second peripheral axial portion of the stator; and
the rotor adapted within the stator, the rotor comprising:
a rotor core formed of a second plurality of laminations, each of the second plurality of laminations having a second thickness of greater than approximately 0.10 inch, the second plurality of laminations formed of high strength steel and sandwiched between a first end region including at least one first peripheral second lamination and a second end region including at least one second peripheral second lamination, the first and second peripheral second laminations having a third thickness, the third thickness greater than the second thickness, the first end region having a first end ring retained by a first retaining ring adapted there around, the second end region having a second end ring retained by a second retaining ring adapted there around, wherein the first retaining ring has a center of mass located substantially distally axially from a point of contact with the first end ring and the second retaining ring has a center of mass located substantially distally axially from a point of contact with the second end ring, and a surface of the rotor core comprises a grooved surface comprising a plurality of individual circumferential grooves adapted about a circumference of the rotor core, to reduce loss.

* * * * *